United States Patent [19]

Kawai

[11] Patent Number: 5,130,541

[45] Date of Patent: Jul. 14, 1992

[54] METHOD OF AND APPARATUS FOR RECORDING AND READING RADIATION IMAGE

[75] Inventor: Yasuhiro Kawai, Kanagawa, Japan

[73] Assignee: Fuji Photo Film Co., Ltd., Kanagawa, Japan

[21] Appl. No.: 701,244

[22] Filed: May 16, 1991

[30] Foreign Application Priority Data

May 21, 1990 [JP] Japan .................................. 2-130841

[51] Int. Cl.$^5$ ........................................... G01N 23/04
[52] U.S. Cl. ................................ 250/327.2; 250/484.1
[58] Field of Search ................ 250/327.2 H, 327.2 J, 250/484.1 B

[56]  References Cited

U.S. PATENT DOCUMENTS 4,851,679  7/1989  Yamura et al. ............... 250/327.2 H

FOREIGN PATENT DOCUMENTS

| 55-12429 | 1/1980 | Japan . |
| 55-116340 | 9/1980 | Japan . |
| 55-163472 | 12/1980 | Japan . |
| 56-11392 | 2/1981 | Japan . |
| 56-11395 | 2/1981 | Japan . |
| 56-12599 | 2/1981 | Japan . |
| 56-104645 | 8/1981 | Japan . |
| 59-192240 | 10/1984 | Japan . |

Primary Examiner—Janice A. Howell
Assistant Examiner—Richard Hanig
Attorney, Agent, or Firm—Sughrue, Mion, Zinn Macpeak & Seas

[57]  ABSTRACT

The radiation image of a subject such as a human spine is recorded on and read from a stimulable phosphor sheet which is circulated in a radiation image recording and reading apparatus. The stimulable phosphor sheet with the radiation image recorded thereon is fed to an image reading unit in which stimulating light is applied to the stimulable phosphor sheet to cause the stimulable phosphor sheet to emit light representative of the recorded radiation image. Then, the stimulable phosphor sheet is fed to and past an erasing unit, which applies erasing light to the stimulable phosphor sheet to erase any residual radiation image information from the stimulable phosphor sheet in the erasing unit, while feeding the stimulable phosphor sheet back past the erasing unit. The stimulable phosphor sheet is held in readiness for recording another radiation image thereon after the residual image information has been erased, and thereafter, the stimulable phosphor sheet is fed to an image recording unit.

10 Claims, 10 Drawing Sheets

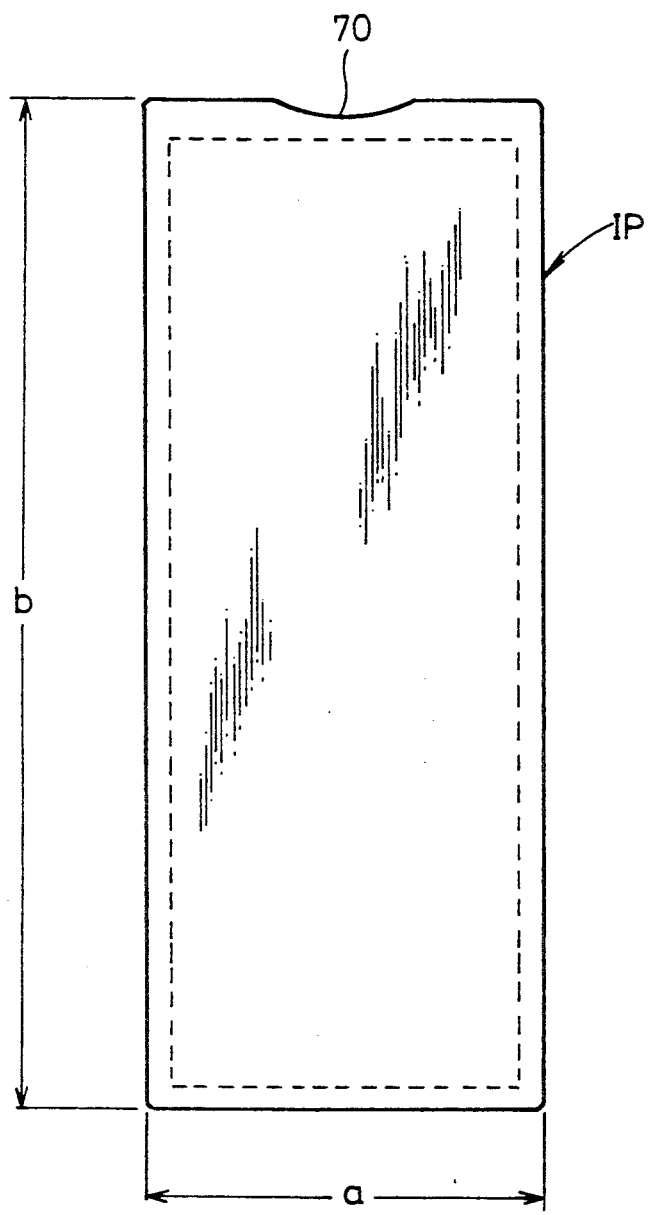

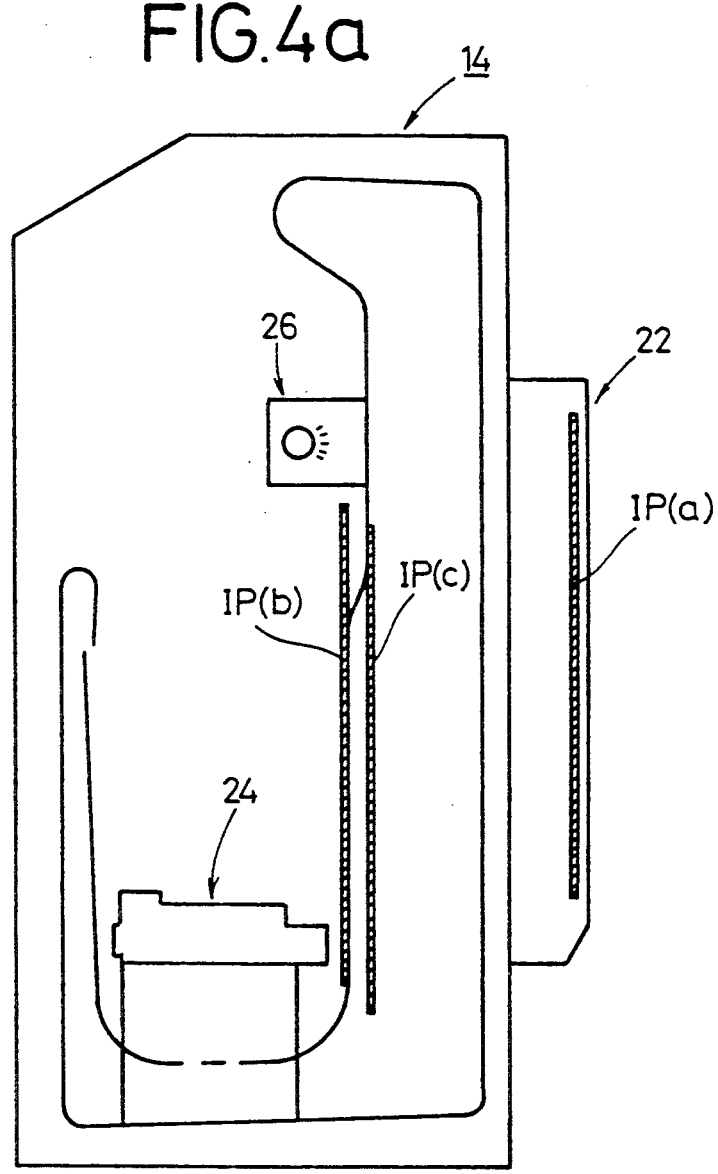

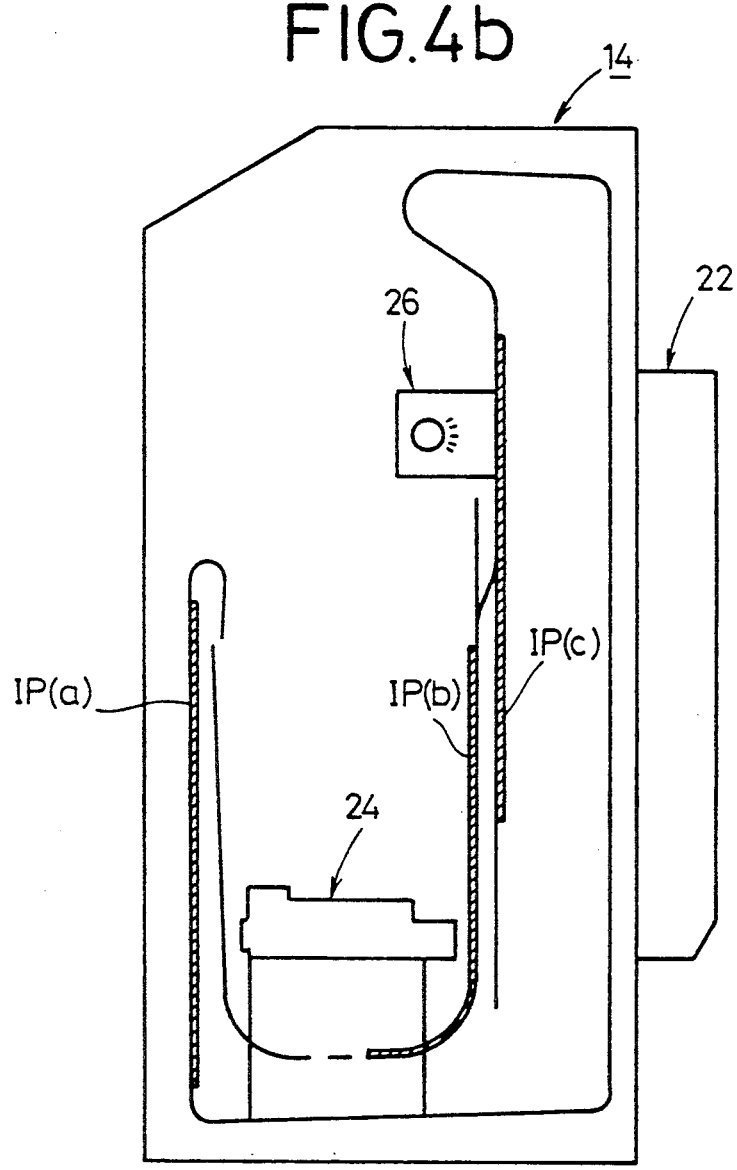

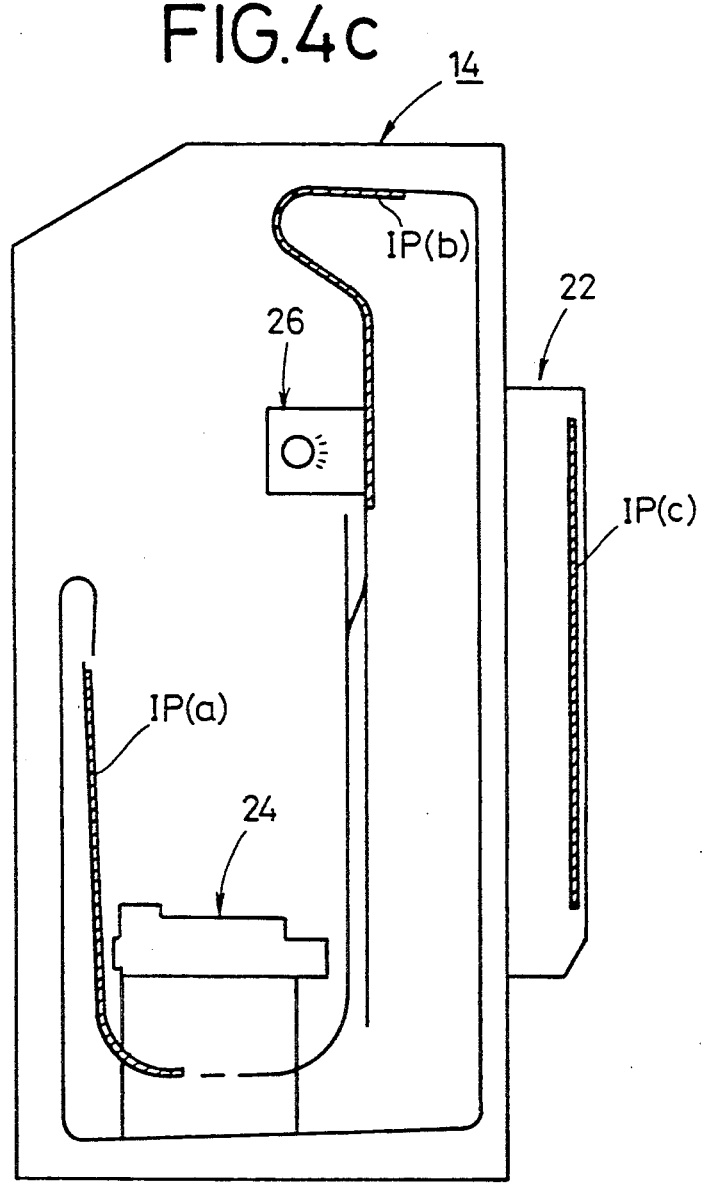

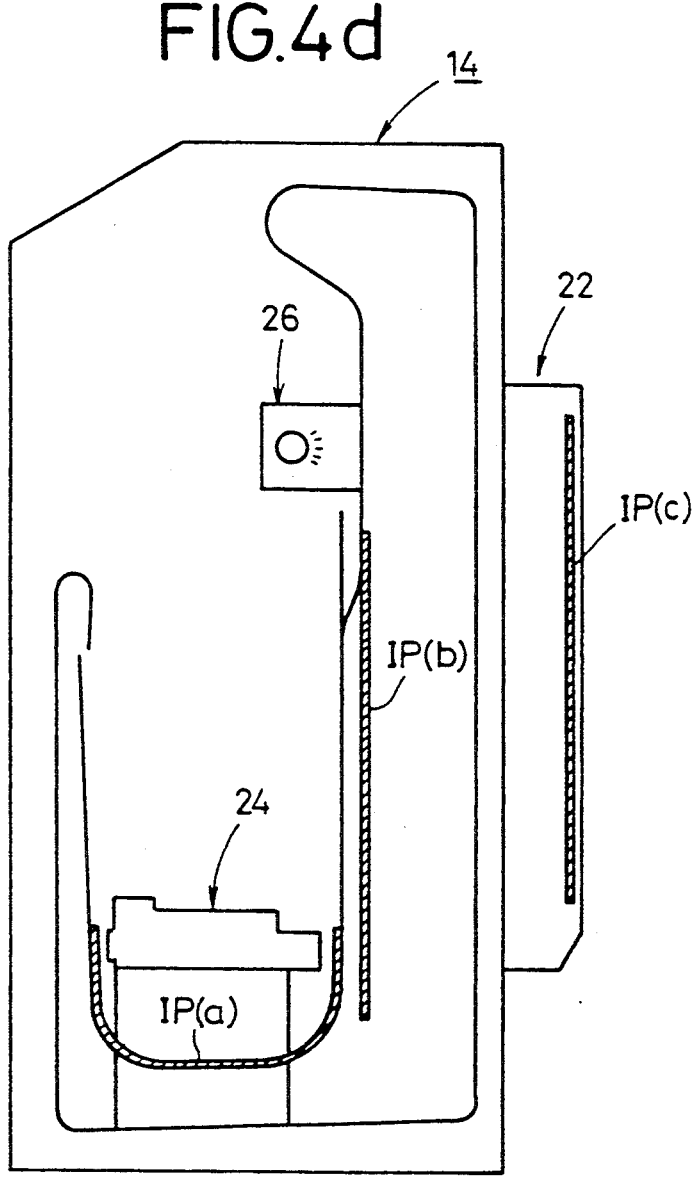

METHOD OF AND APPARATUS FOR RECORDING AND READING RADIATION IMAGE

BACKGROUND OF THE INVENTION

1. Field of the Invention

The present invention relates to a method of and a apparatus for recording and reading a radiation image, and more particularly to a method of and an apparatus for recording the image of a relatively long subject such as the spine, or vertebral column, of a human body on an elongate stimulable phosphor sheet, and reading the recorded image information.

2. Prior Art

There have recently been developed radiation image information recording and reproducing systems for recording the radiation image of a subject, such as a human body, on a stimulable phosphor sheet, then scanning the stimulable phosphor sheet with stimulating light to cause it to emit light, photoelectrically reading the emitted light to produce an image signal, and processing the image signal to obtain a radiation image of the object which may be used for medical diagnosis (see, for example, Japanese Laid-Open Patent Publications Nos. 55-12429, 56-11395, 55-163472, 56-104645, 55-116340, etc).

In the radiation image information recording and reproducing systems, the final radiation image may be reproduced as either a hard copy image or a visible image on a CRT. Since the stimulable phosphor sheet employed in those systems is not a final image carrier for recording image information, but a temporary image carrier from which image information will eventually be transferred to a suitable recording medium. Therefore, the stimulable phosphor sheet may be repeatedly used, and such repeated use of the stimulable phosphor sheet is highly economical.

In order to use a stimulable phosphor sheet again, any residual radiation energy that may remain on the stimulable phosphor sheet from which the emitted light has been read is discharged according to the process disclosed in Japanese Laid-Open Patent Publications Nos. 56-11392 and 56-12599, for example. After the residual radiation image has been erased, the stimulable phosphor sheet is put to use for recording radiation image again.

There has been proposed a built-in type radiation image information recording and reading apparatus in which a stimulable phosphor sheet is circulated for repetitive use, as disclosed in Japanese Laid-Open Patent Publication No. 59-192240. More specifically, the proposed apparatus comprises a circulatory feed means for feeding, along a circulatory path, a stimulable phosphor sheet which can record a radiation image, an image recording unit disposed in the circulatory path for applying a radiation bearing radiation image information of an object to the stimulable phosphor sheet to record the radiation image information on the stimulable phosphor sheet, an image reading unit disposed in the circulatory path and including a stimulating light source for emitting stimulating light to scan the stimulable phosphor sheet on which the radiation image information has been recorded by the image recording unit and a photoelectric reading means for reading light emitted from the stimulable phosphor sheet scanned by the stimulating light to produce an image signal indicative of the recorded radiation image information, and an erasing unit disposed in the circulatory path for discharging any residual radiation energy from the stimulable phosphor sheet before new radiation image information is recorded on the stimulable phosphor sheet after the previous radiation image information has been read by the photoelectric reading means. The stimulable phosphor sheet is circulated along the circulatory path through the image recording unit, the image reading unit, and the erasing unit for repetitive use.

The proposed radiation image information recording and reading apparatus allows successive items of radiation image information to be recorded and read efficiently.

The built-in type radiation image information recording and reading apparatus is designed to record radiation image information with respect to various body parts of patients, including the chest, abdomen, limbs, etc. Stimulable phosphor sheets used to record such radiation image information are selected in sizes (e.g., a half size) depending on the body parts to be recorded.

There is a recent demand for the diagnosis of entire vertebral columns using the built-in type radiation image information recording and reading apparatus. To diagnose an entire vertebral column using the built-in type radiation image information recording and reading apparatus, the image of the vertebral column may be divided into two portions, which are recorded respectively on two stimulable phosphor sheets. However, the recording process is complex and inefficient since two different parts of the vertebral column must be recorded independently. If the patient moved while the image recording unit is moving after one image has been recorded, then no accurate subsequent image would be recorded, and hence no correct diagnosis could be carried out.

One solution would be to use an elongate stimulable phosphor sheet long enough to cover the image of a relatively long subject such as a human spine, or vertebral column, in a built-in type radiation image recording and reading apparatus. However, it would be time-consuming to read the recorded image and erase residual image information from the elongate stimulable phosphor sheet in a small-size built-in type radiation image recording and reading apparatus, making it virtually difficult to shorten the cycle time required to process the stimulable phosphor sheet.

According to one application, a plurality of elongate stimulable phosphor sheets would be successively employed in a small-size built-in type radiation image recording and reading apparatus. Usually, different periods of time are required to record a radiation image on a stimulable phosphor sheet, read a recorded radiation image from a stimulable phosphor sheet, and erase residual image information from a stimulable phosphor sheet. To cope with such different periods of time, it is necessary to provide a standby zone between the image recording unit, the image reading unit, and the erasing unit for holding stimulable phosphor sheets in readiness for next processing operation.

The standby zone in the small-size built-in type radiation image recording and reading apparatus has a bent configuration with a sharply curved path. When an elongate stimulable phosphor sheet is held in the sharply curved path in the standby zone, the stimulable phosphor sheet tends to be largely curved and sometimes damaged. It is desirable to hold a stimulable phosphor sheet in a straight path so that the stimulable phosphor sheet will not have a curling tendency.

SUMMARY OF THE INVENTION

It is a general object of the present invention to provide a method of and an apparatus for recording and reading a radiation image, such as the radiation image of an entire human spine, on and from a plurality of elongate stimulable phosphor sheets successively fed along a circulatory path, within a reduced cycle time while protecting the stimulable phosphor sheets from damage and a curling tendency in a standby zone, the apparatus being relatively small in size.

According to the present invention, there is provided a method of recording and reading a radiation image on and from a stimulable phosphor sheet, comprising the steps of recording a radiation image on a stimulable phosphor sheet in an image recording unit, feeding the stimulable phosphor sheet to an image reading unit, applying stimulating light to the stimulable phosphor sheet to cause the stimulable phosphor sheet to emit light representative of the recorded radiation image in the image reading unit, feeding the stimulable phosphor sheet to and past an erasing unit, applying erasing light to the stimulable phosphor sheet to erase any residual radiation image information from the stimulable phosphor sheet in the erasing unit, while feeding the stimulable phosphor sheet back past the erasing unit, holding the stimulable phosphor sheet in readiness for recording another radiation image thereon after the residual image information has been erased, and thereafter, feeding the stimulable phosphor sheet to the image recording unit.

The method further includes the steps of holding first and second stimulable phosphor sheets at least between the erasing unit and the image reading unit, and feeding the first stimulable phosphor sheet past the erasing unit to the image recording unit when a third stimulable phosphor sheet with a radiation image recorded thereon is fed from the image recording unit to the image reading unit.

The method further includes the steps of after the first stimulable phosphor sheet is fed to the image recording unit, displacing the second stimulable phosphor sheet to the image reading unit, and then feeding the second stimulable phosphor sheet to the erasing unit.

The method further includes the steps of reading the radiation image from the stimulable phosphor sheet or one of the first, second, and third stimulable phosphor sheets, while applying erasing light to another stimulable phosphor sheet or another of the first, second, and third stimulable phosphor sheets to erase the residual radiation image information therefrom.

According to the present invention, there is further provided an apparatus for recording and reading a radiation image on and from a stimulable phosphor sheet, comprising an image recording unit for recording a radiation image on a stimulable phosphor sheet, an image reading unit for applying stimulating light to the stimulable phosphor sheet to cause the stimulable phosphor sheet to emit light representative of the recorded radiation image, an erasing unit for applying erasing light to the stimulable ghosphor sheet to erase any residual radiation image information from the stimulable phosphor sheet, a feed path interconnecting the image recording unit, the image reading unit, and the erasing unit, first, and second, and third standby zones disposed in the feed path for holding stimulable phosphor sheets respectively therein, the first standby zone being positioned in combination with the image recording unit, the second standby zone being positioned downstream of the image reading unit with respect to the feed path, and the third standby zone being positioned to hold a stimulable phosphor sheet which has been fed to and past the erasing unit and then fed back past the erasing unit while the residual radiation image information is erased from the stimulable phosphor sheet by the erasing unit.

The third standby zone is straight in shape for holding the stimulable phosphor sheet in a straight configuration in readiness for recording another radiation image thereon, after the residual radiation image information has been erased therefrom.

The second standby zone extends substantially parallel to the third standby zone, further including a selective switchover path by which the second and third standby zones are interconnected.

Each of the second and third standby zones is long enough to store an elongate stimulable phosphor sheet therein which is at least as long as a human spine, without bending or flexing the stimulable phosphor sheet.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a plan view of a stimulable phosphor sheet employed in the radiation image recording and reading apparatus shown in FIG. 2;

FIGS. 4a through 4e are schematic side elevational views, partly in cross section, illustrative of the positions of stimulable phosphor sheets as they are processed for recording and reading radiation images and erasing residual image information.

DETAILED DESCRIPTION OF THE PREFERRED EMBODIMENT

Figure 1:
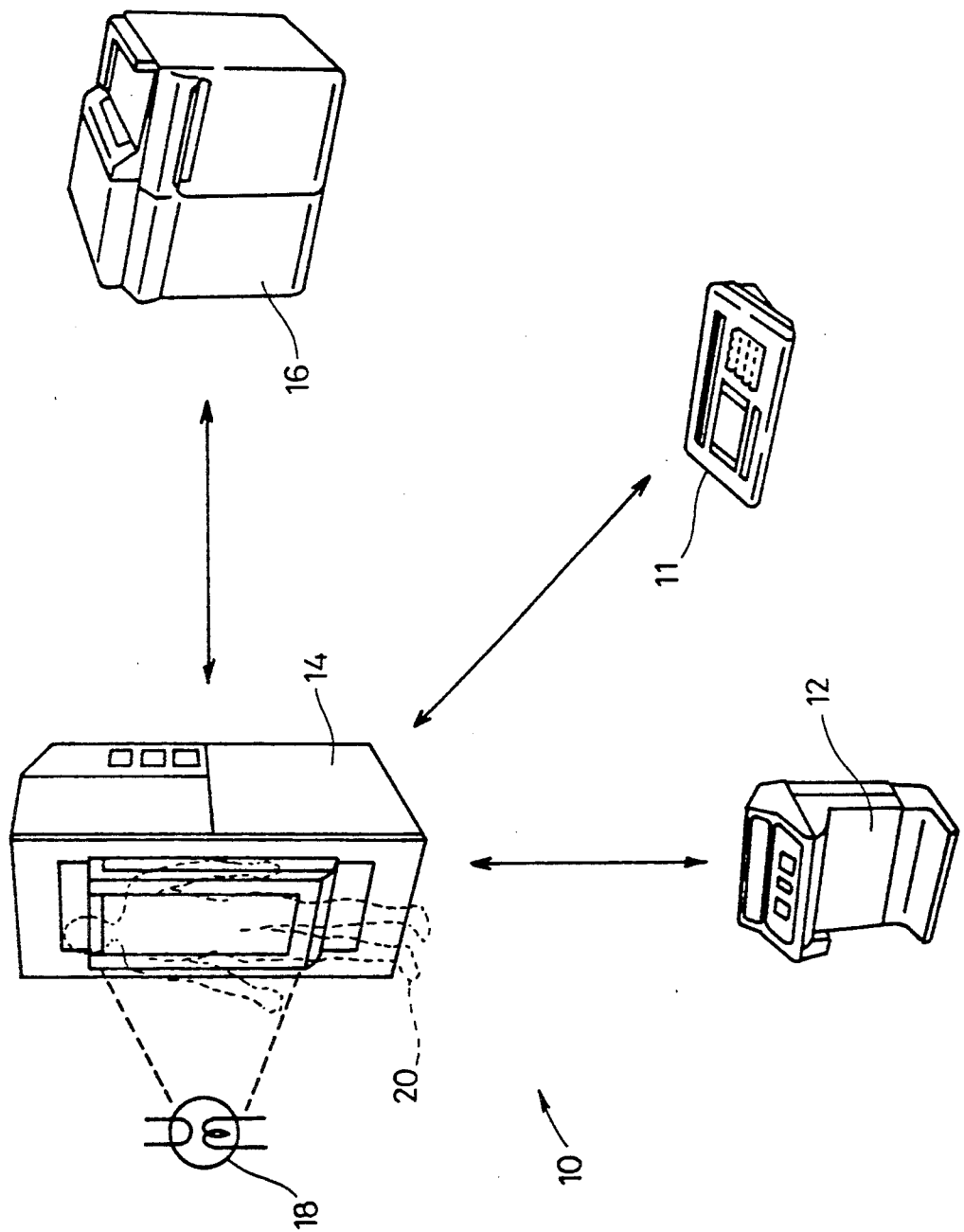
FIG. 1 is a perspective view of a medical diagnostic system which employs stimulable phosphor sheets for recording radiation images.

FIG. 1 shows a medical diagnostic system, generally denoted at 10, employing stimulable phosphor sheets for recording and reading radiation images. The medical diagnostic system 10 generally comprises a control console 11, an X-ray controller 12, a radiation image recording and reading apparatus 14, and an image output apparatus 16. The control console 11 serves to enter various items of recording information such as recording standards, recording sizes, etc. The X-ray controller 12 controls a radiation source 18 to irradiate a subject 20, such as a human body, with a predetermine dose of X-rays.

The radiation image recording and reading apparatus 14 records a radiation image of a local region of the subject 20 on a stimulable phosphor sheet IP (see FIGS. 2 and 3) with X-rays radiated from the radiation source 18. The radiation image recording and reading apparatus 14 also reads the radiation image recorded on the stimulable phosphor sheet IP, converts the read radiation image into an electric signal, and processes the electric signal for better image reproduction.

The stimulable phosphor sheet IP is of an elongate size which is substantially twice the half size. The stimulable phosphor sheet IP will be described in detail later on with reference to FIG. 3.

The image output apparatus 16 reproduces the radiation image of the local region of the subject 20 on a photographic film based on the image signal which is transmitted from the radiation image recording and reading apparatus 14.

Figure 2:
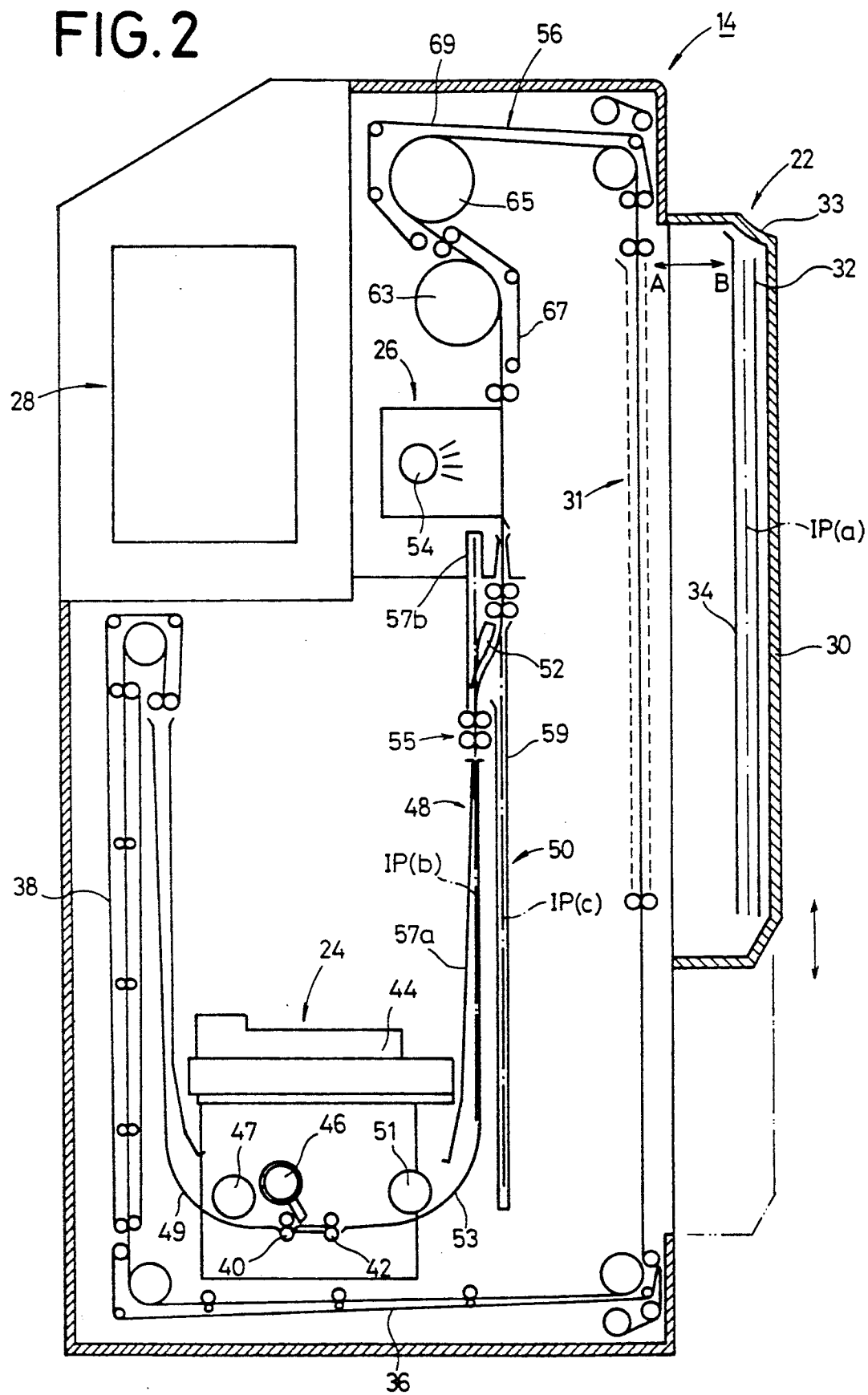
FIG. 2 is a vertical cross-sectional view of a radiation image recording and reading apparatus according to the present invention which is incorporated in the medical diagnostic system shown in FIG. 1.

FIG. 2 shows the radiation image recording and reading apparatus 14 as a whole. The radiation image recording and reading apparatus 14 comprises an image recording unit 22 for applying X-rays through the subject 20 to a stimulable ghosphor sheet IP to record the radiation image of the subject 20 on the stimulable phosphor sheet IP, an image reading unit 24 for applying stimulating light such as a laser beam to the stimulable phosphor sheet IP on which the radiation image is recorded, and for photoelectrically reading light emitted from the stimulable phosphor sheet IP in response to the applied stimulating light, an erasing unit 26 for discharging a residual radiation energy from the stimulable phosphor sheet IP before a new radiation image is recorded again on the stimulable phosphor sheet IP in the image recording unit 22, and a control unit 28 for controlling the image recording unit 22, the image reading unit 24, and the erasing unit 26. The radiation image recording and recording apparatus 14 has a feed path for feeding stimulable phosphor sheets therealong, the feed path being established by various feed systems and standby zones (described later on).

The image recording unit 22 has an exposure base 30 which projects on a front panel of the radiation image recording and reading apparatus 14. The exposure base has a vertical length corresponding to the length of a human spine or vertebral column, for example. The exposure base 30 is vertically displaceable along the front panel of the apparatus 14. The exposure base 30 has on its upper end a jaw receiver 33 in the form of a curved recess for holding the jaw of the subject 20 as a human body while the subject 20 is being exposed to the X-rays.

The image recording unit 22 includes front and rear vertical plates 32, 34 for sandwiching a stimulable phosphor sheet IP therebetween. The front and rear vertical plates 32, 33 are horizontally displaceable by a link mechanism (not shown) between the front wall of the exposure base 30 and a first standby zone 31 disposed immediately behind the exposure base 30, in the directions indicated by the arrows A, B.

The image reading unit 24 is connected to the image recording unit 22 through feed systems 36, 38 each composed of rollers and belts. The image reading unit 24 comprises two pairs of nip rollers 40, 42 for gripping a stimulable phosphor sheet IP which is fed by the feed system 38, an optical unit 44 for applying a laser beam as stimulating light to the stimulable phosphor sheet IP between the nip roller pairs 40, 42, and a light guide unit 46 for reading light which is emitted from the stimulable phosphor sheet IP in response to the applied laser beam and indicates the radiation image recorded on the stimulable phosphor sheet IP. The light guide unit 46 comprises an elongate photomultiplier tube for converting the light emitted from the stimulable phosphor sheet IP into an electric signal. The image reading unit 24 also includes a large-diameter roller 47 and a curved guide 49 which are disposed closely to and upstream of the nip roller pair 40, and a large-diameter roller 50 and a curved guide 53 which are disposed closely and downstream of the nip roller pair 42.

The elongate stimulable phosphor sheet IP fed by the feed system 38 is guided by the roller 47 and the curved guide 49 into the image reading unit 24, passes through the nip roller pairs 40, 42, and is guided by the roller 50 and the curved guide 53 toward a second standby zone 48 for temporarily holding the stimulable phosphor sheet IP.

The second standby zone 48 is positioned downstream of the image reading unit 24 with respect to the feed path and extends vertically near the image reading unit 24. The second standby zone 48 is paralleled by a third standby zone 50. The second and third standby zones 48, 50 are coupled to each other by a selective switchover path (described later on) which is partly composed of a standby zone selector 52. The second standby zone 48 has two pairs of rollers 55 for gripping an elongate stimulable phosphor sheet IP, and vertical guide plates 57a, 57b disposed downstream and upstream, respectively, of the roller pairs 55. The standby zone selector 52 is positioned above the roller pairs 55, and angularly displaceable with respect to the guide plate 57b and a guide plate 59 of the third standby zone 50.

Figure 5A:
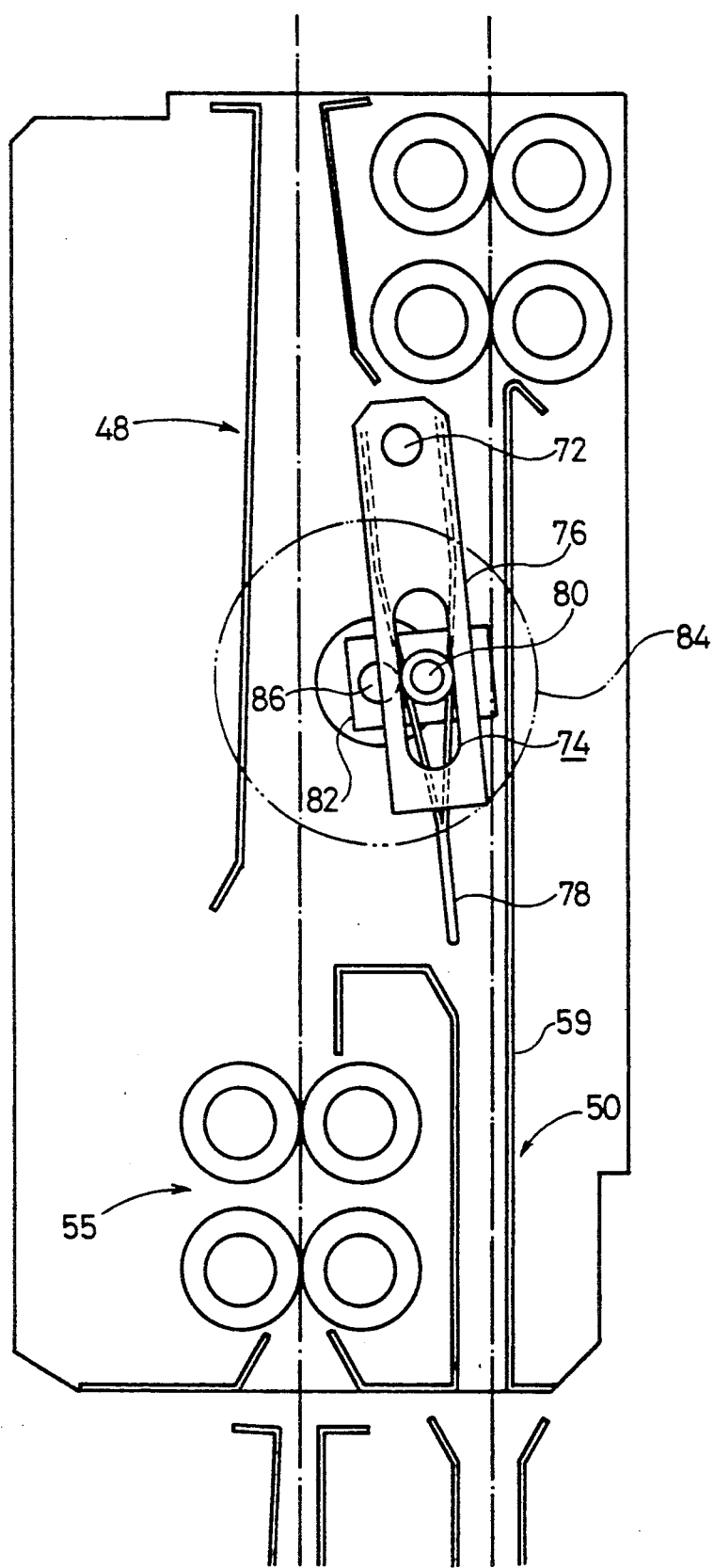
FIGS. 5a and 5b are schematic side elevational views of a standby zone selector for guiding a stimulable phosphor sheet selectively into second and third standby zones.
Figure 5B:
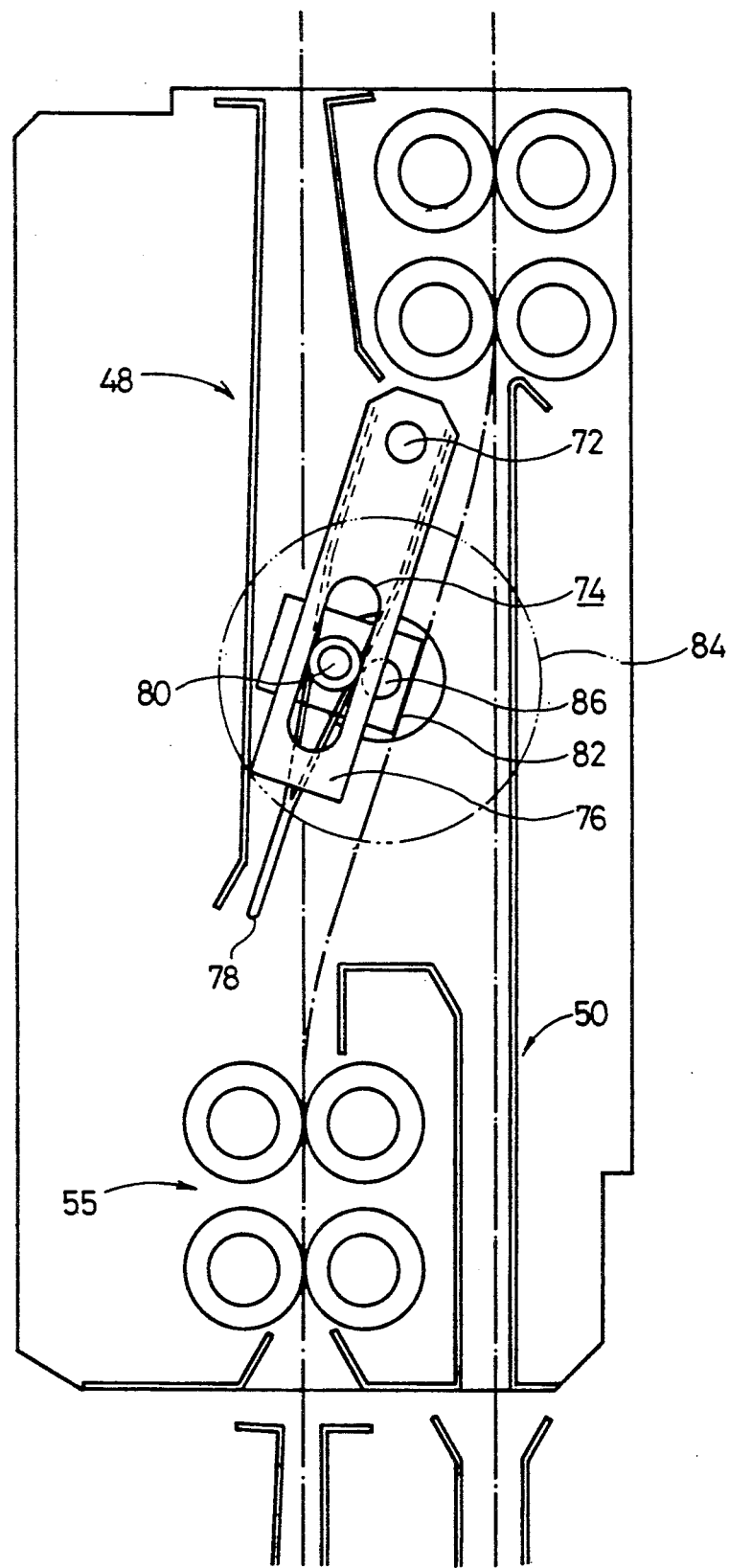

As shown in FIGS. 5a and 5b, the standby zone selector 52 is pivotally supported at its upper end by a shaft 72 and is swingable at the lower end thereof between the second and third standby zones 48, 50. The standby zone selector 52 comprises a substantially rectangular, long plate 76 having an oblong hole 74 defined therein and supported by the shaft 72, a guide plate 78 fixed to the plate 76 and having a lower end portion projecting downwardly beyond the lower end of the plate 76, a shaft 80 slidably fitted in the oblong hole 74, and a crank member 82 secured to the shaft 80. The crank member 82 is joined at one end thereof to a drive shaft 86 of a motor 84. When the motor 84 is energized, the crank member 82 joined to the drive shaft 86 is rotated to cause the shaft 80 to move in and along the oblong hole 74 while angularly moving the guide plate 78 about the shaft 72 between the second and third standby zones 48, 50, thus selecting one of the second and third standby zones 48, 50 at a time. Therefore, the standby zone selector 52 and surrounding parts of the second and third standby zones 48, 50 jointly serve as a selective switchover path interconnecting the second and third standby zones 48, 50. The standby zone selector 52 may alternatively be angularly displaced by a solenoid (not shown) coupled to thereto.

As shown in FIG. 2, the erasing unit 26 is positioned above the third standby zone 50. The erasing unit 26 has an erasing light source 54 such as a halogen lamp or the like for emitting erasing light to erase any residual image information from the stimulable phosphor sheet IP. The erasing unit 26 is connected at its downstream end to a feed system 56 which in turn is connected to the first standby zone 31. The feed system 56 has large-diameter rollers 63, 65 against which respective belt conveyors 67, 69 are movably held. The large-diameter rollers 63, 65 are laterally displaced from each other such that the upper roller 65 is positioned slightly leftwardly of the lower roller 63. When a stimulable phosphor sheet IP is fed upwardly into the feed system 56, it is gripped by the roller 63 and the belt conveyor 67. The stimulable phosphor sheet IP is first fed upwardly to the left by the roller 63 and the belt conveyor 67, and then fed along a largely curved path by the roller 65 and the belt conveyor 69, after which the stimulable phosphor sheet IP is fed downwardly into the first standby zone 31.

The control unit 28 controls operation of the erasing unit 26 to discharge the energy of residual radiation image information from stimulable phosphor sheets IP, and also controls operation of the image recording unit 22 and the image reading unit 24.

The elongate stimulable phosphor sheet IP is illustrated in detail in FIG. 3. The elongate stimulable phosphor sheet IP has a transverse dimension or width a and a longitudinal dimension or length b, the length b being at least twice the width a. The stimulable phosphor sheet IP has a recess 70 defined in one of the longitudinal ends thereof by an arcuate edge. When the stimulable phosphor sheet IP is positioned in the image recording unit 22, the recess 70 thereof is horizontally aligned with the jaw receiver 33 of the exposure base 30. Typically, the elongate stimulable phosphor sheet IP is at least as long as the average human spine.

The medical diagnostic system 10, the radiation image recording and reading apparatus 14, and the stimulable phosphor sheet IP are of the basic structure as described above. Now, operation of the radiation image recording and reading apparatus 14 will be described below.

First, the operator enters various items of recording information depending on the parts of the subject 20 to be imaged, e.g., the entire spine, the chest, the abdomen, etc, through the control control 11 into the control unit 28. At this time, three elongate stimulable phosphor sheets IP(a), IP(b), IP(c), each long enough to cover the entire spine, are loaded respectively in the first, second, and third standby zones 31, 48, 50, as shown in FIG. 2. Then, the operator moves the exposure base 30 vertically into a position horizontally aligned with the part of the subject 20 to be imaged. The stimulable ghosphor sheet IP(a) sandwiched between the front and rear plates 32, 34 in the first standby zone 31 is horizontally displaced in the direction indicated by the arrow B into the front region of the exposure base 30 by the link mechanism (not shown), as shown in FIG. 4a. The chest of the subject 20, who is standing up, is held against the exposure base 30 with the jaw in the jaw receiver 33 and the neck straight up.

The operator then operates on the X-ray controller 12 to control the radiation source 18 for applying X-rays to the subject 20. The applied X-rays pass through the subject 20 and record the radiation of the entire spine on the stimulable phosphor sheet IP(a) between the front and rear plates 32, 34 in the exposure base 30. The stimulable phosphor sheet IP(a) on which the radiation image is thus recorded is horizontally displaced again in the direction indicated by the arrow A into the first standby zone 31, and then fed to the image reading unit 24 by the feed systems 36, 38.

When it is confirmed that the stimulable phosphor sheet IP(a) from the image recording unit 22 is fed to the image reading unit 24, as shown in FIG. 4b, the stimulable phosphor sheet IP(c) in the third standby zone 50 is fed to the image recording zone 22, as shown in FIG. 4c. More specifically, the stimulable phosphor sheet IP(c) in the third standby zone 50 is fed to the first standby zone 31 by the roller 63, the belt conveyor 67, the roller 75, and the belt conveyor 69, and stays in the first standby zone 31 in readiness for a next exposure process. At the same time, the stimulable phosphor sheet IP(b) in the second standby zone 48 first returns to the guide 53. After the guide plate 78 of the standby zone selector 52 has been displaced toward the second standby zone 48, the stimulable phosphor sheet IP(b) is fed through the standby zone selector 52 to and past the erasing unit 26.

The stimulable phosphor sheet IP(b) is thereafter fed back past the erasing unit 26 to the third standby zone 50, while any residual image information is erased from the stimulable phosphor sheet IP(b) by the erasing unit 26, as shown in FIGS. 4c and 4d. Then, the stimulable phosphor sheet IP(b) is held in the third standby zone 50. While the residual image information is being erased from the stimulable phosphor sheet IP(b), the radiation image recorded on the stimulable phosphor sheet IP(a) is read by the image reading unit 24, and another radiation image of the subject 20 is recorded on the stimulable phosphor sheet IP(c) by the image recording unit 22.

Figure 4E:
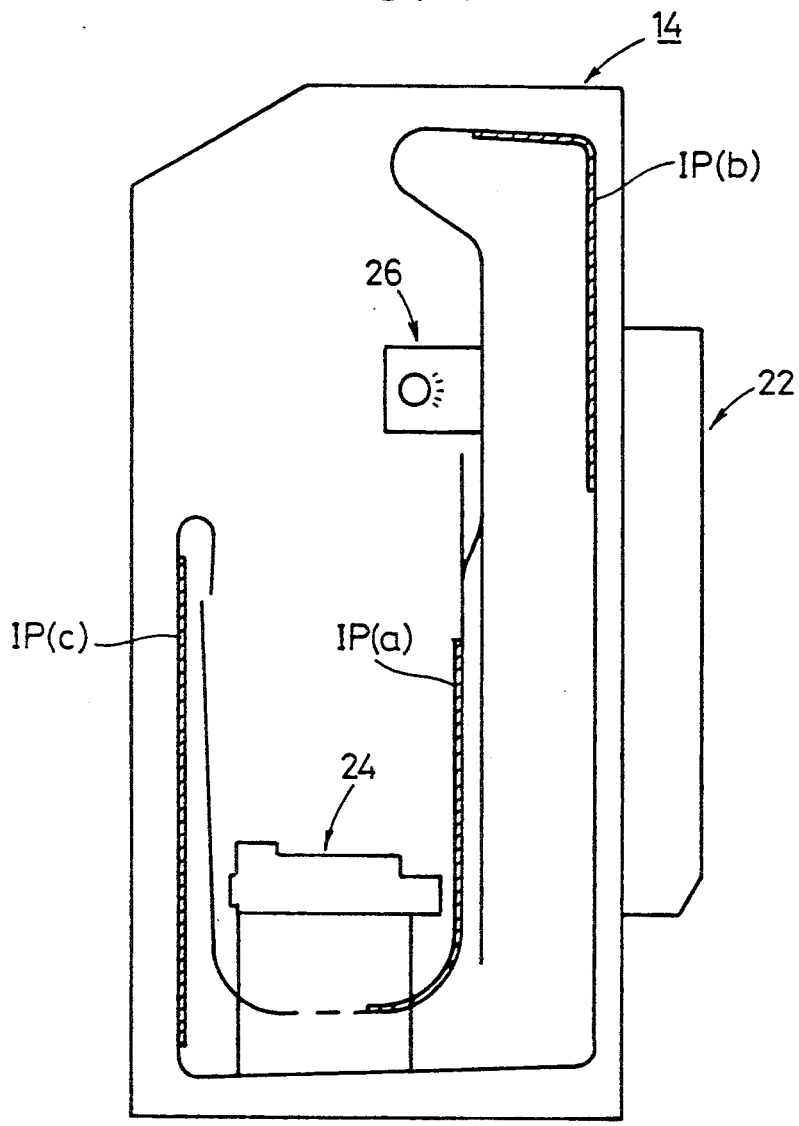

After the radiation image has been read from the stimulable phosphor sheet IP(a) by the image reading unit 24, the stimulable phosphor sheet IP(a) is fed to the erasing unit 26 provided the stimulable phosphor sheet IP(b) has already been fed from the third standby zone 50 to the image recording unit 22. The stimulable phosphor sheet IP(c) on which the radiation image is now recorded is fed to and held in the feed system 38 that is positioned immediately upstream of the image reading unit 24. If, at this time, the stimulable phosphor sheet IP(a) is present in the image reading unit 24 for image reading, then the stimulable phosphor sheet IP(c) stays in the feed system 38. If the radiation image has already been read from the stimulable phosphor sheet IP(a), then the stimulable phosphor sheet IP(c) is delivered to the image reading unit 24, as shown in FIG. 4e. The stimulable phosphor sheet IP(b) is fed from the third standby zone 50 to the image recording unit 22. If the stimulable phosphor sheet IP(b) is still present in the third standby zone 50, the stimulable phosphor sheet IP(a) from the image reading unit 24 stays in the second standby zone 48. If no stimulable phosphor sheet IP(b) is present in the third standby zone 50, the stimulable phosphor sheet IP(a) is fed to the erasing unit 26.

The image reading unit 24 operates as follows:

The stimulable phosphor sheet IP gripped by the nip roller pairs 40, 42 is irradiated with the laser beam generated by the optical unit 44. In response to the applied laser beam, the stimulable phosphor sheet IP emits light, which is converted into an electric signal by the light guide unit 46. The image reading unit 24 may read the recorded radiation image in main and preliminary reading modes. More specifically, in the preliminary reading mode, the radiation image recorded on the stimulable phosphor sheet IP is roughly read, and image processing conditions are established on the basis of the roughly read radiation image information. In the main reading mode, the recorded radiation image is fully read according to the established image processing conditions. More specifically, while the stimulable phosphor sheet IP is being fed through the image reading unit 24, the recorded radiation image is roughly read in the preliminary reading mode. Thereafter, the stimulable phosphor sheet IP is fed back to the feed system 38, and then fed again to the image reading unit 24 by which the recorded radiation image is fully read in the main reading mode. After the recorded radiation image has been recorded, the stimulable phosphor sheet IP is fed to the erasing unit 26. While the stimulable phosphor sheet IP is delivered back to the third standby zone 50, as described above, the erasing light source 54 of the erasing unit 26 is energized to apply erasing light to the stimulable phosphor sheet IP to erase any residual radiation image information therefrom.

According to the present invention, as described above, since the feed systems for feeding stimulable phosphor sheets in the built-in type radiation image recording and reading apparatus are not of a bent configuration, but are straight in shape, the stimulable phosphor sheets fed thereby do not have a curling tendency which would otherwise be imparted if stayed in curved paths. Specifically, the stimulable phosphor sheets are held in straight shapes in the first, second, and third standby zones. Because the stimulable phosphor sheets are not unduly bent or flexed when they stay in the standby zones, their durability is not impaired, and they are prevented from suffering cracks or other damages which would otherwise be caused when unduly bent.

The second and third standby zones are positioned such that the erasing unit erases residual image information from stimulable phosphor sheets while they are being fed back into the third standby zone away from the image recording unit. As a result, when there is a stimulable phosphor sheet present in the image recording unit, a next stimulable phosphor sheet is not required to stay in the erasing unit which is kept at high temperature during operation, and hence is protected from temperature-induced damage.

Moreover, inasmuch as the second and third standby zones are employed, it is possible to read a recorded radiation image and erase residual image information at the same time. Accordingly, the cycle time required to record and read a radiation image can be shortened. No readout irregularities or errors are brought about when a recorded radiation image is read from a stimulable phosphor sheet because the stimulable phosphor sheet, even if it is elongate, is held out of contact with the feed systems.

As described above, the stimulable phosphor sheets used in the radiation image recording and reading apparatus remain highly durable over a long period of repeated use, and are not unduly bent or flexed in the apparatus which is relatively small in size. Since the stimulable phosphor sheets are protected against cracks or other damage, diagnostic processes using the stimulable phosphor sheets are free of errors which would otherwise result from the defects of the stimulable phosphor sheets. The stimulable phosphor sheets are not exposed to a high-temperature atmosphere in the erasing unit, and the image information read therefrom is prevented from readout irregularities or errors. Radiation images can be recorded and read, and residual image information can be erased efficiently in short periods of time because the recording, reading, and erasing processes can simultaneously be effected using a plurality of stimulable phosphor sheets.

Although a certain preferred embodiment has been shown and described, it should be understood that many changes and modifications may be made therein without departing from the scope of the appended claims.

What is claimed is:

1. A method of recording and reading a radiation image on and from a stimulable phosphor sheet, comprising the steps of:

recording a radiation image on a stimulable phosphor sheet in an image recording unit;

feeding the stimulable phosphor sheet to an image reading unit;

applying stimulating light to the stimulable phosphor sheet to cause the stimulable phosphor sheet to emit light representative of the recorded radiation image in said image reading unit;

feeding the stimulable phosphor sheet in one direction to and past an erasing unit;

applying erasing light to the stimulable phosphor sheet to erase any residual radiation image information from the stimulable phosphor sheet in said erasing unit, while feeding the stimulable phosphor sheet back past said erasing unit in a second direction opposite to said one direction;

holding the stimulable phosphor sheet in readiness for recording another radiation image thereon after the residual image information has been erased; and thereafter, feeding the stimulable phosphor sheet to said image recording unit for again applying erasing light thereto.

2. A method according to claim 1, further including the steps of:

holding first and second stimulable phosphor sheets at least between said erasing unit and said image reading unit; and feeding said first stimulable phosphor sheet past said erasing unit to said image recording unit when a third stimulable phosphor sheet with a radiation image recorded thereon is fed from said image recording unit to said image reading unit.

3. A method according to claim 2, further including the steps of:

after said first stimulable phosphor sheet is fed to said image recording unit, displacing said second stimulable phosphor sheet to said image reading unit, and then feeding said second stimulable phosphor sheet to said erasing unit.

4. A method according to any one of claims 1 through 3, further including the step of:

reading the radiation image from said stimulable phosphor sheet or one of said first, second, and third stimulable phosphor sheets, while applying erasing light to another stimulable phosphor sheet or another of said first, second, and third stimulable phosphor sheets to erase the residual radiation image information therefrom.

5. An apparatus for recording and reading a radiation image on and from a stimulable phosphor sheet, comprising:

an image recording unit for recording a radiation image on a stimulable phosphor sheet;

an image reading unit for applying stimulating light to the stimulable phosphor sheet to cause the stimulable phosphor sheet to emit light representative of the recorded radiation image., an erasing unit for applying erasing light to the stimulable phosphor sheet to erase any residual radiation image information from the stimulable phosphor sheet;

a feed path interconnecting said image recording unit, said image reading unit, and said erasing unit;

first, second, and third standby zones disposed in said feed path for holding stimulable phosphor sheets respectively therein;

said first standby zone being positioned in combination with said image recording unit;

said second standby zone being positioned downstream of said image reading unit with respect to said feed path; and said third standby zone being positioned to hold a stimulable phosphor sheet which has been fed to and past said erasing unit and then fed back past said erasing unit while the residual radiation image information is erased from the stimulable phosphor sheet by said erasing unit.

6. An apparatus according to claim 5, wherein said third standby zone is straight in shape for holding the stimulable ghosphor sheet in a straight configuration in readiness for recording another radiation image thereon, after the residual radiation image information has been erased therefrom.

7. An apparatus according to claim 5, wherein said second standby zone extends substantially parallel to said third standby zone, further including a selective switchover path by which said second and third standby zones are interconnected.

8. An apparatus according to claim 6, wherein said second standby zone extends substantially parallel to said third standby zone, further including a selective switchover path by which said second and third standby zones are interconnected.

9. An apparatus according to claim 7, wherein each of said second and third standby zones is long enough to store an elongate stimulable phosphor sheet therein which is at least as long as a human spine, without bending or flexing the stimulable phosphor sheet.

10. An apparatus according to claim 8, wherein each of said second and third standby zones is long enough to store an elongate stimulable phosphor sheet therein which is at least as long as a human spine, without bending or flexing the stimulable phosphor sheet.

* * * * *